United States Patent [19]

Piney

[11] Patent Number: 5,357,394
[45] Date of Patent: Oct. 18, 1994

[54] CIRCUIT BREAKER WITH SELECTIVE LOCKING

[75] Inventor: Philippe Piney, Villard Bonnot, France

[73] Assignee: Merlin Gerin, France

[21] Appl. No.: 945,268

[22] Filed: Sep. 15, 1992

[30] Foreign Application Priority Data

Oct. 10, 1991 [FR] France .................. 91 12600

[51] Int. Cl.⁵ .......................................... H01H 77/00
[52] U.S. Cl. .................................. 361/72; 361/71
[58] Field of Search ...................... 361/72, 71, 72–75, 361/93–97

[56] References Cited

U.S. PATENT DOCUMENTS

| | | | |
|---|---|---|---|
| 3,567,997 | 3/1971 | Moran | 361/72 |
| 3,878,436 | 4/1975 | Bogel | 361/72 |
| 4,351,013 | 9/1982 | Matsko et al. | 361/96 |

*Primary Examiner*—A. D. Pellinen
*Assistant Examiner*—Sally C. Medley

[57] ABSTRACT

The electronic trip device comprises a device for selecting the faults which are to bring about locking of the circuit breaker contacts in the open position. When a fault in the power supply system protected by the circuit breaker leads to a trip, the trip device orders locking if this fault is one of the faults selected by the selection device.

10 Claims, 3 Drawing Sheets

CIRCUIT BREAKER WITH SELECTIVE LOCKING

BACKGROUND OF THE INVENTION

The invention relates to a circuit breaker comprising contacts, a contact actuating mechanism and an electronic trip device supplying a tripping signal to a control device of the actuating mechanism to bring about opening of the contacts in the event of a fault occurring on the power supply system to be monitored, the mechanism control device comprising means for locking the actuating mechanism in the open position, and the trip device comprising means for detecting the type of fault.

Some conventional circuit breakers comprise locking means designed to lock the contacts in the open position. This is generally achieved by means of a key acting mechanically on the actuating mechanism or on its control and preventing closing of the contacts so long as it is in the locked position.

The object of the invention is to improve this type of circuit breaker so as to adapt it to better suit the user's requirements and to favor, depending on the installation in which it is incorporated, either continuity of operation or safety.

SUMMARY OF THE INVENTION

This object is achieved by the fact that the trip device comprises means for selecting the faults which are to bring about locking, the circuit breaker comprising means for controlling locking connected to the trip device and controlling the locking means so as to lock the actuating mechanism in the open position when the fault having brought about tripping corresponds to one of the faults selected by the selection means.

In this way, whereas state-of-the-art locking means compulsorily favored safety, the invention enables the user to modulate the importance he assigns to safety and to continuity of service to suit his requirements. In the extreme case, if continuity of service is considered to take priority, locking can be suppressed. To give a non-restrictive example, locking can be automatic when the circuit breaker has opened because of a fault due to a short-circuit (instantaneous or short delay fault) or an earth fault, the circuit breaker being on the other hand able to be reset normally in the case of an overload (long delay fault).

Selection of the faults which are to bring about locking can be performed by means of a selector switch connected directly to the processing unit of the trip device, or to an interface connecting the processing unit to means for controlling locking, or by means of switches designed to selectively connect the processing unit to the means for controlling locking.

According to a preferred embodiment, the means for controlling locking comprise a coil supplied with power when a locking order is applied to it by the trip device.

In a first alternative embodiment, the coil directly actuates a mechanical component locking the actuating mechanism.

If the actuating mechanism control device is an electromechanical control device enabling closing of the circuit breaker to be controlled electrically, by remote control, in a second alternative embodiment the electromechanical control device can comprise an electromagnet connected to a power supply source by a control switch, the locking means comprising a contact, normally closed, serially connected with said control switch, and whose opening is controlled by said coil. In a third alternative embodiment, it can comprise a closing electromagnet connected to a power supply source by means of a control component, normally closed, whose opening followed by closing brings about closing of the circuit breaker contacts, the coil controlling a contact, normally open, connected in parallel with said control component.

BRIEF DESCRIPTION OF THE DRAWINGS

Other advantages and features will become more clearly apparent from the following description of illustrative embodiments of the invention, given as non-restrictive examples only and represented in the accompanying drawings in which.

DESCRIPTION OF THE PREFERRED EMBODIMENT

Figure 1:
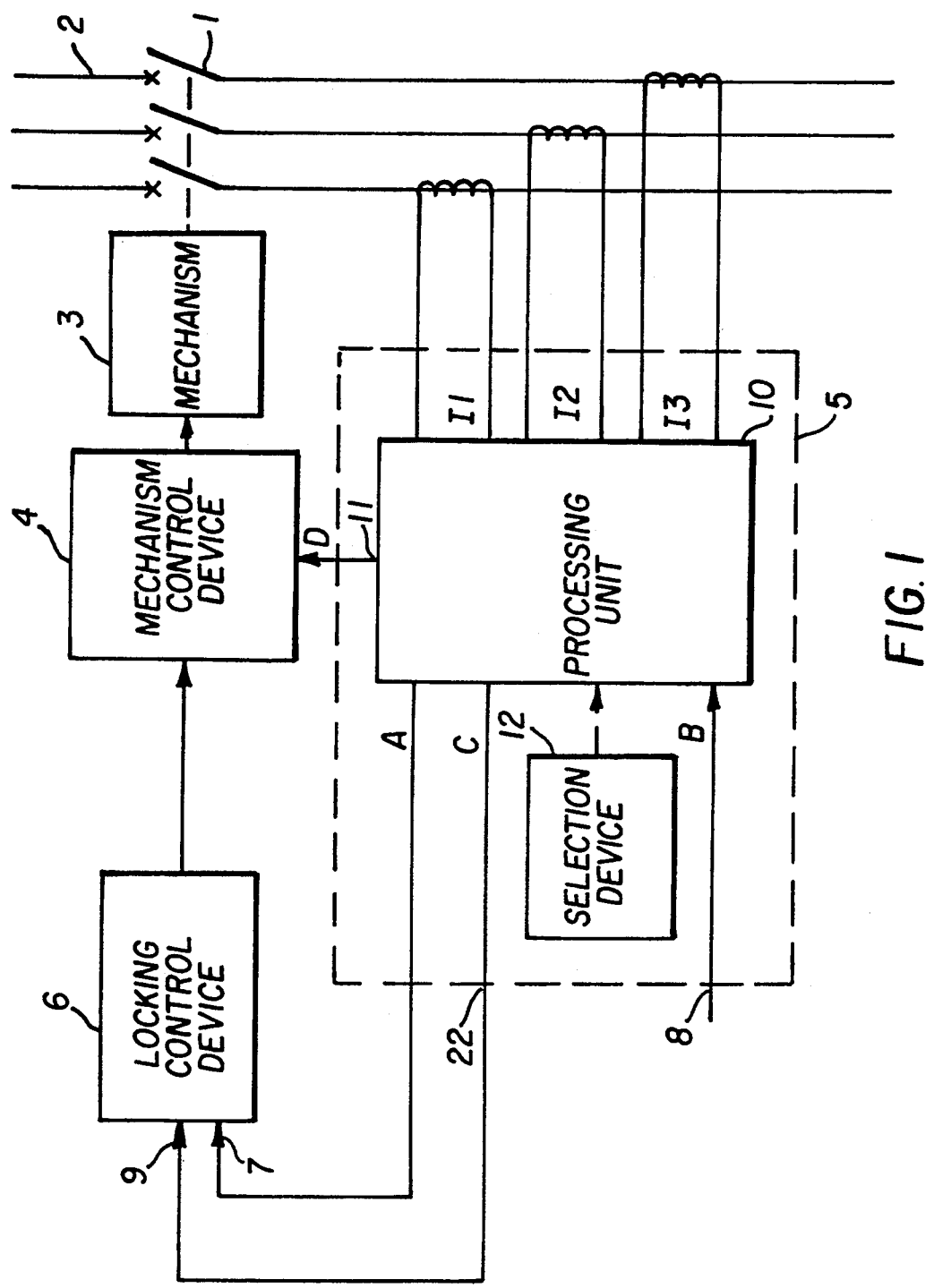
FIG. 1 illustrates, in block diagram form, a circuit breaker according to the invention.

The circuit breaker illustrated in FIG. 1 comprises contacts 1 arranged in an electrical power supply system 2 to be protected. In conventional manner, opening and closing of the contacts are controlled by an actuating mechanism 3, itself controlled by a control device 4. Values representative of the currents flowing in the power supply system 2 are applied to the inputs of an electronic trip device 5. The latter supplies the control device 4 with a tripping signal D designed to bring about opening of the contacts 1 in the event of a fault, for example an overload, short-circuit or earth fault, occurring on the power supply system 2.

The control device 4 of the contact actuating mechanism 3 comprises components enabling the mechanism to be locked in the open position of the contacts. These locking components are controlled by a locking control device 6. When the device 6 receives (input 7) a locking order A it orders, via the control device 4 and actuating mechanism 3, the contacts 1 to be maintained in the open position. Closing of the contacts is only authorized by application of an acknowledgement order B to an input 8 of the trip device, leading to an unlocking order C being applied to an input 9 of the locking control device 6.

In FIG. 1, only those components of the trip device 5 indispensable for understanding the invention are represented. The trip device 5 comprises a processing unit 10, for example microprocessor-based, receiving on input analog signals (I1,I2,I3) representative of the currents flowing in the power supply system 2. The processing unit compares these signals with preset thresholds and supplies if applicable (output 11) a tripping signal to the operating device 4.

In the embodiment represented in FIG. 1, a device 12 for selecting the faults which are to give rise to locking is connected to the processing unit 10. The latter conventionally comprises means for detecting the type of fault enabling the nature of the fault, long delay, short delay, instantaneous or earth fault, which led to tripping, to be stored in memory. This information can be displayed on the trip device and/or transmitted to an external monitoring device (not shown). The processing unit 10 compares this information relating to the nature of the fault and the information supplied by the selection device 12 and produces a locking order when the fault corresponds to one of the faults selected by the device 12.

Figure 2:
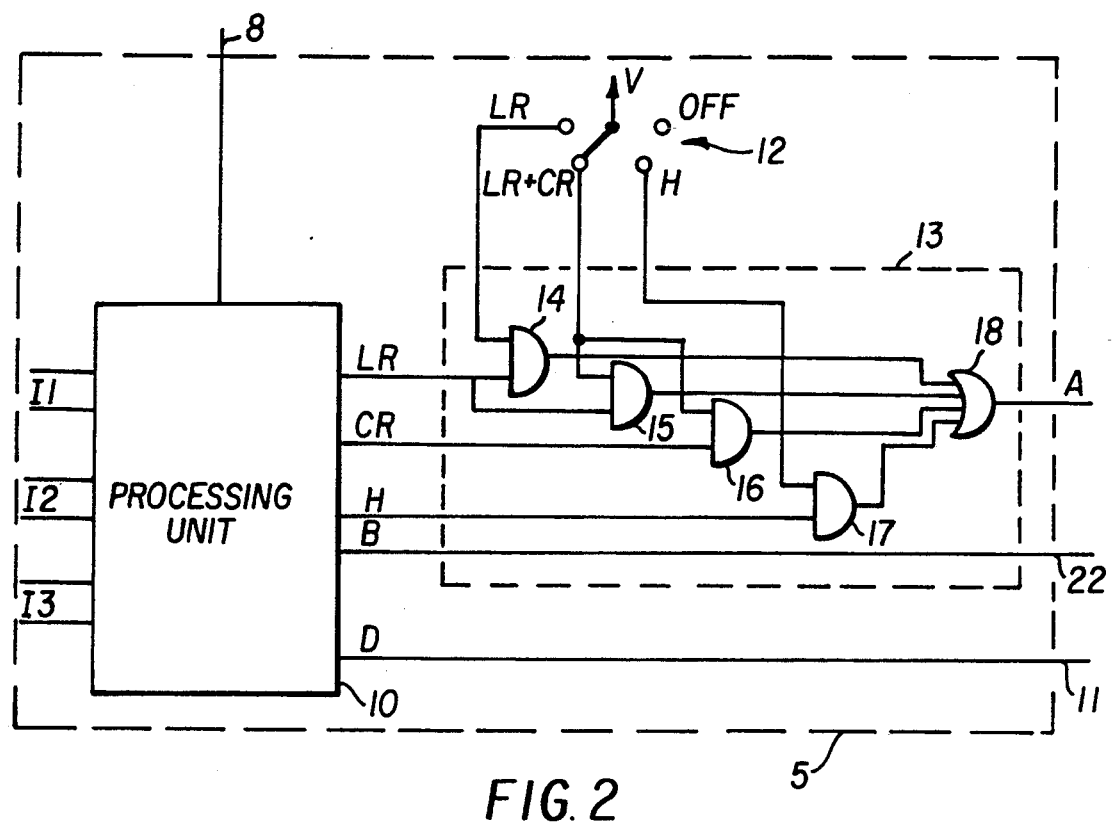
FIGS. 2 and 3 represent two alternative embodiments of the trip device of a circuit breaker according to FIG. 1.

In the alternative embodiment represented in FIG. 2, the selection device 12 is connected on output of the processing unit. It comprises a selector switch whose common point is connected to a power supply voltage V. In the figure the selector switch comprises four positions corresponding selectively to selection of the following faults: long delay (LR), long delay and short delay (LR+CR), earth fault (H) and no fault (OFF). A logic circuit 13 is connected to the selector switch outputs and to outputs of the processing unit to which a signal is applied selectively when the corresponding fault has brought about tripping. In the particular embodiment represented in the figure, three faults being liable to lead to a locking order, the processing unit outputs (LR,CR,H) corresponding to these three faults are connected to the logic circuit. The logic circuit represented is formed by four AND gates. Gate 14 is connected to the output LR of the processing unit and to the output LR of the selector switch. It therefore supplies a logic signal 1 when the selector switch is in the position LR and a long delay fault has led to tripping. Gate 15 is connected to the output LR of the processing unit and to the output LR+CR of the selector switch, gate 16 to the output CR of the processing unit and to the output LR+CR of the selector switch, and gate 17 is connected to the outputs H of the processing unit and of the selector switch. An OR gate 18, whose inputs are connected respectively to the outputs of the AND gates, 14 to 17, supplies on output a locking order when the fault detected by the processing unit corresponds to one of the faults selected by the selector switch 12. In the OFF position of the latter, no locking order is produced, whatever the type of fault which led to tripping.

The logic circuit can naturally be formed by analog type comparators just as well as by logic gates of the type described above.

Figure 3:
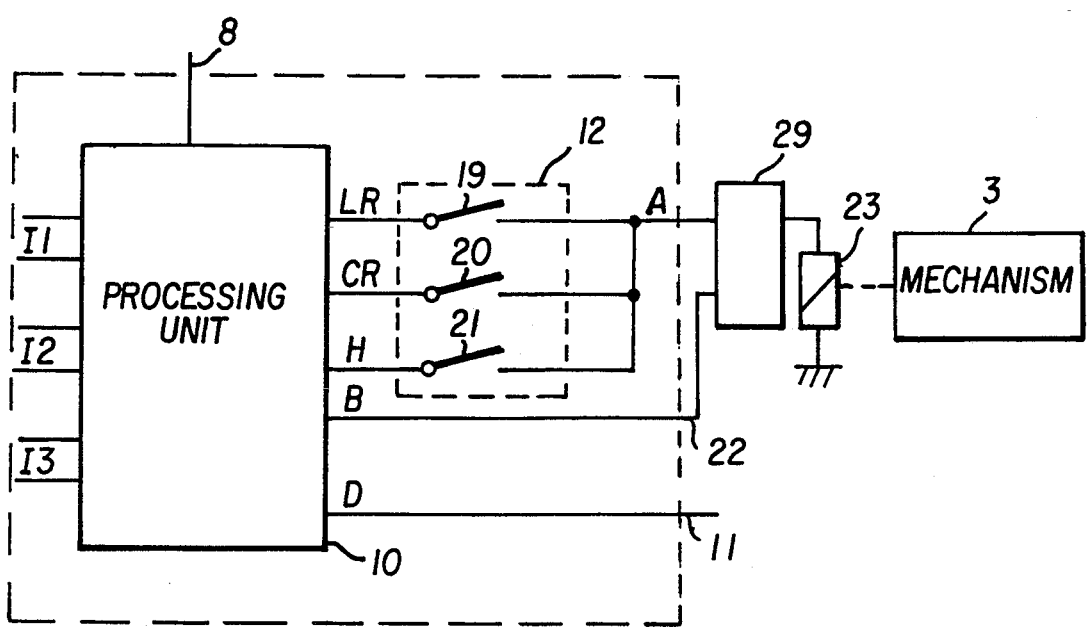

In the alternative embodiment represented in FIG. 3, the selection device 12 is formed by a series of switches connected on output of the processing unit. A switch is provided on each of the processing unit outputs supplying a signal corresponding to a particular type of fault, for example a switch 19 connected to the output associated with a long delay fault (LR), a switch 20 connected to the output associated with a short delay fault (CR) and a switch 21 connected to the output associated with an earth fault (H). The other ends of the switches are connected to the trip device output designed to supply a locking order. If switch 19 only is closed, a locking order will be produced only in the event of a long delay fault. If switches 19 and 20 are closed, a locking order will be produced both in the event of a short delay fault and of a long delay fault.

According to a simplified embodiment (not represented), the three switches 19, 20 and 21 of the device 12 in FIG. 3 can be replaced by a 3 or 4-position selector switch, whose common point supplies the signal A, so as to selectively connect this common point to one of the outputs (LR,CR,H) of the processing unit or to a fourth position (floating or grounded) in which no locking order is produced.

The different alternative embodiments described above thus enable the trip device to produce a locking order if, and only if, the fault detected is one of the faults selected by the device 12.

In the different embodiments described above, application of an acknowledgement order to the input 8 of the trip device produces an unlocking order on an output 22 of the trip device.

The locking control device preferably comprises a coil 23 connected in such a way as to have a current flowing through it in the presence of a locking order. As represented in FIG. 3, the coil 23 is for example connected to the output of a storage circuit 29 to whose input the signal A is applied. The unlocking signal B is applied to a zero reset input of the circuit 29 and its application cuts the current in the coil 23.

Figure 6:
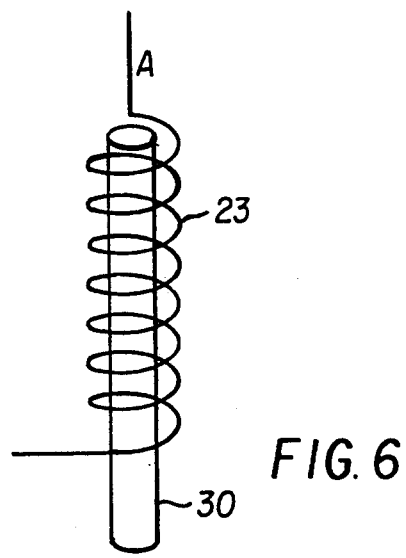
FIG. 6 illustrates an embodiment of the mechanism control device illustrated in FIG. 1.

This coil can comprise a plunger 30 as shown in FIG. 6 acting directly on an actuating mechanism component so as to prevent the contacts from closing.

Figure 4:
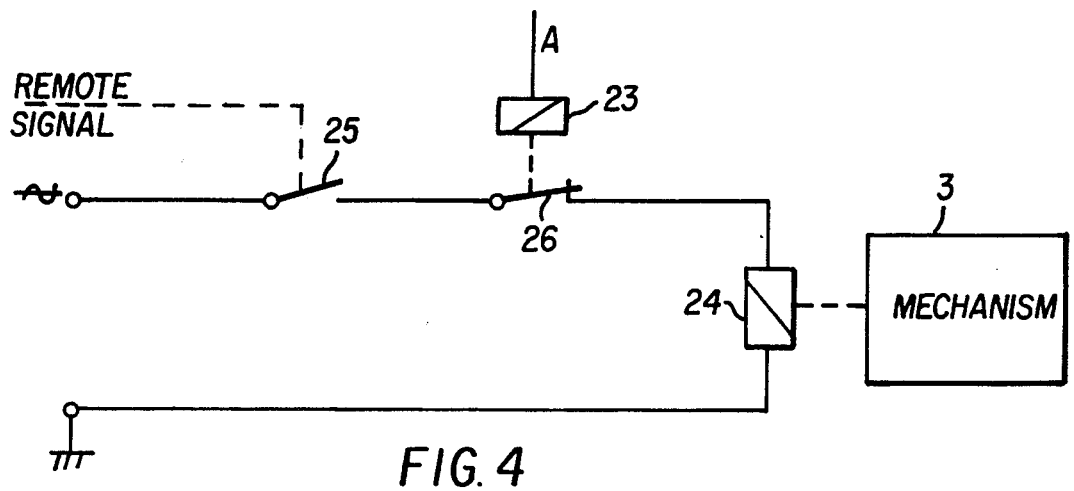
FIGS. 4 and 5 illustrate two alternative embodiments of the devices for controlling locking of a circuit breaker according to FIG. 1.
Figure 5:
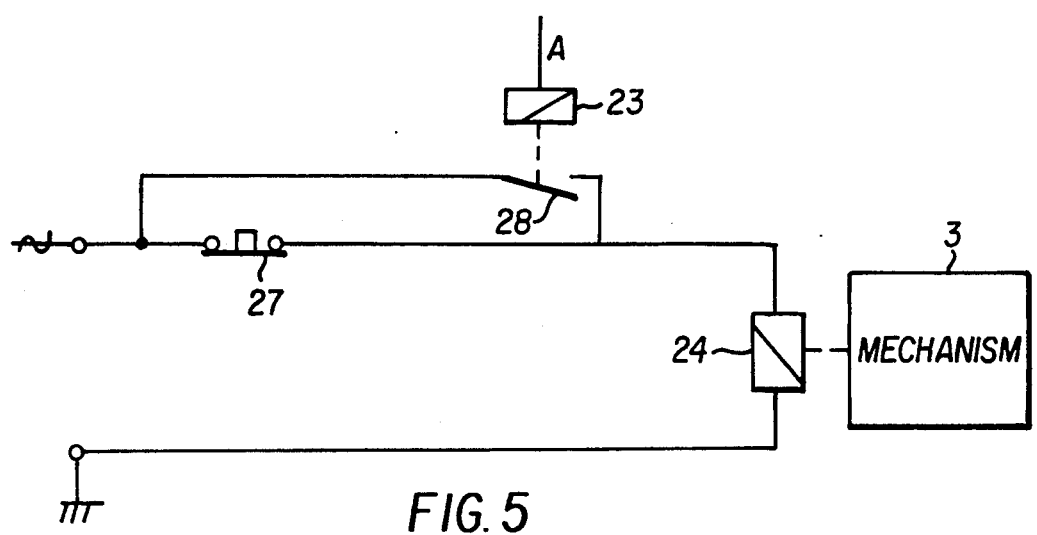

In FIGS. 4 and 5, the circuit breaker actuating mechanism 3 is controlled by an electromagnet 24 enabling the circuit breaker to be controlled electrically, and possibly remotely.

In the embodiment in FIG. 4, the electromagnet 24 is connected to the terminals of a voltage source, A.C. in the figure, via a control switch 25, closing of the switch 25 bringing about closing of the circuit breaker. The locking device is formed by a contact 26, normally closed, serially connected with the switch 25 in the power supply circuit of the electromagnet 24. The locking control device is formed by a coil 23. When a locking order is applied to the coil 23 by the trip device 5 (FIGS. 1 to 3), a current flows through the coil and causes the contact 26 to open. The power supply to the electromagnet 24 is then interrupted whatever the position of the switch 25, thus preventing the circuit breaker from closing and locking it in the open position.

In the embodiment in FIG. 5, the electromagnet 24 is a closing electromagnet connected in such a way as to perform anti-pumping. The electromagnet 24 is connected to the terminals of a voltage source, A.C. in the figure, via a switch 27, for example a pushbutton, normally closed. The circuit breaker comprises an opening electromagnet (not shown) able to be controlled by an opening pushbutton or by a tripping order from the trip device. After opening, which may be on a fault in response to a tripping order, or voluntary by actuation of an opening pushbutton, the circuit breaker can only be reclosed after opening of the push-button 27 followed by its closing (anti-pumping operation). In this embodiment, a locking contact 28 is connected in parallel with the closing pushbutton 27. This contact 28, normally open, is closed by the coil 23 when the latter receives a locking order from the trip device 5, thus preventing the power supply to the closing electromagnet 24 from being interrupted and locking the circuit breaker in the open position. To reclose the circuit breaker, an acknowledgement order must be applied to the trip device which produces an unlocking order opening the contact 28 and authorizing actuation of the circuit breaker by the closing pushbutton 27.

In the case where the circuit breaker comprises a manual closing control acting directly on the contact actuating mechanism, the locking control device must naturally also lock this manual control. To achieve this, the locking coil can, for example, act mechanically, via a plunger, on the manual closing button.

The invention is not limited to the embodiments represented. Thus, notably, the voltage source supplying the electromagnet 24 in FIGS. 4 and 5 can be a D.C. voltage source. Likewise the selection device 12 can enable other fault combinations than those represented to be selected, for instance:
- short-circuit, corresponding to a short delay or instantaneous fault,
- long delay and earth protection,
- short-circuit and earth protection,
- long delay and short-circuit,
- long delay, short-circuit and earth protection.

I claim:

1. A circuit breaker comprising:
   contacts;
   a contact actuating mechanism;
   mechanism control means for controlling the contact actuating mechanism, wherein the mechanism control means controls the contact actuating mechanism to open the contacts when a tripping signal is applied to a tripping input of the mechanism control means;
   locking control means, in response to a lock signal, which controls the operation of the mechanism control means to lock the contact actuating mechanism in a position corresponding to an open position of the contacts; and
   an electronic trip device for generating the tripping signal when a fault occurs on a power supply system to be monitored, wherein the electronic trip device includes detecting means for detecting the type of fault causing the generation of the tripping signal, selection means for selecting one of a plurality of predetermined types of fault, and means for generating and supplying the lock signal to the locking control means when the type of fault detected by the detecting means corresponds to the predetermined type of fault selected by selection means.

2. The circuit breaker according to claim 1, wherein the electronic trip device comprises a processing unit and the selection means is connected to the processing unit.

3. The circuit breaker according to claim 1, wherein the electronic trip device includes an interface comprising inputs connected to the detecting means, inputs connected to the selection means, and an output connected to a lock signal input of the locking control means.

4. The circuit breaker according to claim 1, wherein the selection means comprises a plurality of switches, each of which is connected between a common lock signal output of the electronic trip device and to one of a plurality of fault type outputs of the detecting means, wherein each fault type output corresponds to one of the plurality of predetermined types of faults, and wherein the common lock signal output is coupled to a lock signal input of the locking control means.

5. The circuit breaker according to claim 1, wherein the electronic trip device supplies an unlock control signal to an unlock input of the locking control means when an acknowledgement signal is supplied to an acknowledgement input of the electronic trip device, and wherein the locking control means controls the mechanism control means to unlock the contact actuating mechanism.

6. The circuit breaker according to claim 1, wherein the locking control means includes a coil that is energized upon receipt of the lock signal.

7. The circuit breaker according to claim 6, wherein the mechanism control means is a plunger that is controlled by the coil.

8. The circuit breaker according to claim 6, wherein the mechanism control means is an electromechanical control device.

9. The circuit breaker according to claim 8, wherein the electromechanical control device comprises an electromagnet connected to a power supply source by a control switch, operable by a remote control signal supplied thereto, and the coil controls the opening of a normally closed contact connected in series with the control switch.

10. The circuit breaker according to claim 8, wherein said electromechanical control device comprises a closing electromagnet connected to a power supply source by means of a normally closed control component, wherein an opening followed by a closing of the control component closes the contacts of the circuit breaker, and wherein the coil controls a normally open contact connected in parallel with the control component.

* * * * *